(12) United States Patent
Makineni et al.

(10) Patent No.: US 6,292,886 B1
(45) Date of Patent: Sep. 18, 2001

(54) SCALAR HARDWARE FOR PERFORMING SIMD OPERATIONS

(75) Inventors: Sivakumar Makineni, Sunnyvale, CA (US); Sunnhyuk Kimn, Campbell, CA (US); Gautam B. Doshi, Sunnyvale, CA (US); Roger A. Golliver, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/169,865

(22) Filed: Oct. 12, 1998

(51) Int. Cl.[7] .................................................. G06F 17/16
(52) U.S. Cl. ........................................... 712/222; 708/501
(58) Field of Search ................... 712/222, 2, 3, 712/9, 22; 708/204, 501, 496

(56) References Cited

U.S. PATENT DOCUMENTS

| | | | |
|---|---|---|---|
| 4,595,911 | * 6/1986 | Kregness et al. ....................... 341/78 |
| 5,063,497 | * 11/1991 | Cutler et al. .............................. 712/6 |
| 5,278,945 | * 1/1994 | Basehore et al. ....................... 706/41 |
| 5,450,607 | * 9/1995 | Kowalczyk et al. ................... 712/41 |
| 5,751,987 | * 5/1998 | Mahant-Shetti et al. ................ 711/5 |
| 5,761,103 | * 6/1998 | Oakland et al. ...................... 708/497 |
| 5,801,975 |   9/1998 | Thayer et al. . |
| 5,880,984 |   3/1999 | Burchfiel et al. . |
| 6,131,104 | * 10/2000 | Oberman .............................. 708/204 |

* cited by examiner

*Primary Examiner*—William M. Treat
(74) *Attorney, Agent, or Firm*—Leo V. Novakoski

(57) ABSTRACT

A system for processing SIMD operands in a packed data format includes a scalar FMAC and a vector FMAC coupled to a register file through an operand delivery module. For vector operations, the operand delivery module bit steers a SIMD operand of the packed operand into an unpacked operand for processing by the first execution unit. Another SIMD operand is processed by the vector execution unit.

19 Claims, 5 Drawing Sheets

SCALAR HARDWARE FOR PERFORMING SIMD OPERATIONS

BACKGROUND OF THE INVENTION

1. Technical Field

The present invention relates to systems for processing data and, in particular, to systems for processing data through single-instruction multiple data (SIMD) operations.

2. Background Art

Processor designers are always looking for ways to enhance the performance of microprocessors. Processing multiple operands in parallel provides one avenue for gaining additional performance from today's highly optimized processors. In certain common mathematical calculations and graphics operations, the same operation(s) is performed repeatedly on each of a large number of operands. For example, in matrix multiplication, the row elements of a first matrix are multiplied by corresponding column elements of a second matrix and the resulting products are summed (multiply-accumulate). By providing appropriate scheduling and execution resources, multiply-accumulate operations may be implemented concurrently on multiple sets of row-column operands. This approach is known as vector processing or single instruction, multiple data stream (SIMD) processing to distinguish it from scalar or single instruction, single data stream (SISD) processing.

In order to implement SIMD operations efficiently, data is typically provided to the execution resources in a "packed" data format. For example, a 64-bit processor may operate on a packed data block, which includes two 32-bit operands. In this example, a vector FMAC instruction, FMAC ($f_1$, $f_2$, $f_3$), multiplies each of a pair of 32-bit operands stored in register $f_1$ with a corresponding pair of 32-bit entries stored in register $f_2$ and adds the resulting products to a pair of running sums stored in register $f_3$. In other words, data is stored in the registers $f_1$, $f_2$, and $f_3$ in a packed format that provides two operands from each register entry. If the processor has sufficient resources, it may process two or more packed data blocks, e.g. four or more 32-bit operands, concurrently. The 32 bit operands are routed to different execution units for processing in parallel and subsequently repacked, if necessary.

Even in graphics-intensive and scientific programming, not all operations are SIMD operations. Much of the software executed by general-purpose processors comprises instructions that perform scalar operations. That is, each source register specified by an instruction stores one operand and each target register specified by the instruction receives one operand. In the above example, a scalar floating point mulitply-accumulate instruction, S-FMA ($f_1$, $f_2$, $f_3$), may multiply a single 64-bit operand stored in register $f_1$ with corresponding 64-bit operand stored in register $f_2$ and add the product to a running sum stored in register $f_3$. Each operand processed by S-FMA instruction is provided to the FMAC unit in an unpacked format.

The register files that provide source operands to and receive results from execution units consume significant amounts of a processor's die area. Available die area is a scarce resource on most processor chips. For this reason, processors typically include one register file for each major data type. For example, a processor typically has one floating point register file that stores both packed and unpacked floating point operands. Consequently, packed and unpacked operands are designed to fit in the same sized register entries, despite the fact that a packed operand includes two or more component operands.

Providing execution resources for packed and unpacked operands creates performance/cost challenges. One way to provide high performance scalar and vector processing is to include separate scalar and vector execution units. An advantage of this approach is that the vector and scalar execution units can each be optimized to process data in its corresponding format, i.e. packed and unpacked, respectively. The problem with this approach is that the additional execution units consume silicon die area, which is a relatively precious commodity.

The present invention addresses these and other problems with currently available SIMD systems.

SUMMARY OF THE INVENTION

A system is provided that supports processing of component operands from a packed operand on a scalar execution resource, without significantly reducing the performance of the scalar execution resource on unpacked operands.

In accordance with the present invention, a system includes an operand delivery module and a scalar execution unit. The operand delivery module identifies a packed operand and converts a component operand of the packed operands for processing by the scalar execution unit.

For one embodiment of the invention, the operand delivery system may provide component operands to multiple scalar execution units or to a combination of scalar and vector execution units to implement SIMD operations. For example, a scalar FMAC may operate in conjunction with a vector FMAC, designed to process component operands from a packed operand, to implement a vector FMAC instruction (V-FMA).

BRIEF DESCRIPTION OF THE DRAWINGS

The present invention may be understood with reference to the following drawings in which like elements are indicated by like numbers. These drawings are provided to illustrate selected embodiments of the present invention and are not intended to limit the scope of the invention.

DETAILED DISCUSSION OF THE INVENTION

Figure 1:
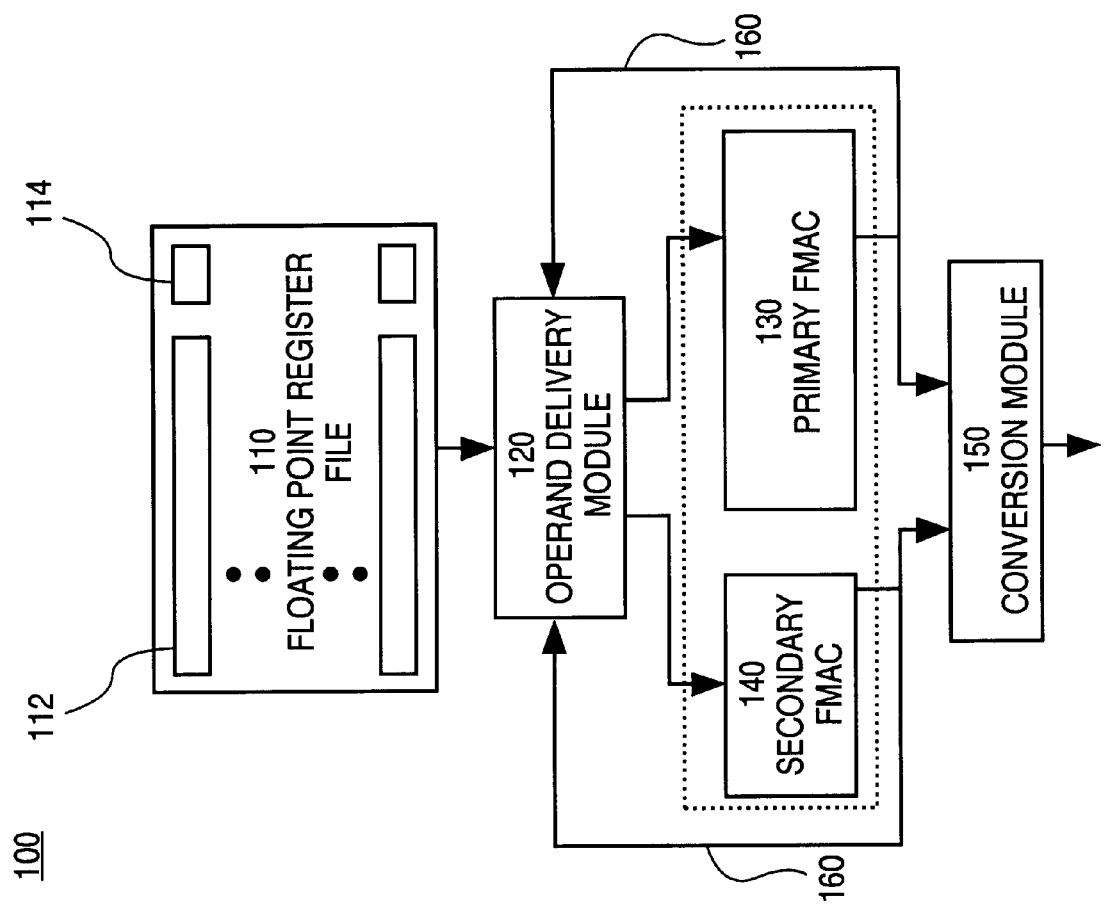
FIG. 1 is a block diagram of a floating point execution system in accordance with the present invention.

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

Processor architectures typically specify a format for storing data in on-chip resources, such as register files. This register file format is selected to accommodate the various data types handled by the processor's execution resources, as well as any ancillary information used to process the data.

The data types to be accommodated may be, for example, those specified by IEEE 754-1985, the IEEE standard for binary floating point arithmetic. The register file format supports efficient processing by storing operand data in a format that is readily accessed and processed by the execution resources.

For scalar processing, each operand is stored as an unpacked operand in the register file format. Here, "unpacked" refers to a data format that allows no more than one operand to be represented by data in a register file entry. For example, a processor may accommodate one single precision operand, one double precision operand, or one double extended precision unpacked operand per register file entry in the processor's register file format. For vector processing, multiple component operands are provided in a packed operand that fits in a single register file entry.

Accommodating packed and unpacked operands in a single register size means that the operands are mapped to the register entries differently in each case. These differences are accommodated in the resources that transfer and execute the different sized operands. For example, a packed operand having two 32-bit component operands may be processed using two 32-bit execution units. An unpacked operand in the same system may be processed as a single 64-bit operand by a 64-bit execution unit. In this example, three different execution units, two 32-bit vector execution units and one 64-bit scalar execution unit, are provided for each execution pipeline, but only two operands are ever processed in parallel by the pipeline. The additional execution unit consumes precious silicon die area and power.

An alternative to providing two vector execution units is to modify the scalar execution unit to process both scalar and vector operands. This approach eliminates the need for one of the vector execution units. However, modifying the scalar unit in this way can degrade its performance on unpacked operands.

The present invention provides a system that processes data provided in packed and unpacked formats efficiently, without significantly increasing the silicon die area of the processor or degrading the processor's performance on unpacked data. An operand delivery mechanism converts a component operand from a packed operand into a format suitable for processing by a scalar execution unit. The operand delivery system may implement operand conversion by bit-steering to avoid loading the system with additional logic gates. This significantly reduces the impact of operand conversion on the system's performance, while preserving the scalar execution unit's performance on unpacked data.

For one embodiment of the present invention, the scalar execution unit operates in conjunction with a vector execution unit to process packed operands. The converted operand and an unconverted component operand are provided to the scalar and vector execution units, respectively, for processing. For one embodiment of the invention, the operand delivery mechanism includes bit-steering traces and inverters that convert one of the component operands into a scalar format without significantly loading the execution resources. This in turn preserves processor performance on scalar operations.

The scalar execution unit may be a floating point multiply-accumulate module (FMAC) optimized to process an unpacked operand in a register file format (RFF). The vector execution unit may be an FMAC unit that is optimized to process a component operand provided by a packed operand in a packed data format (PDF). The operand delivery module may include a MUX having an additional leg to deliver bit resteered traces to the scalar execution unit, and an inverter to modify selected bits of the component operand for processing as an unpacked operand.

FIG. 1 is a block diagram of a floating point system 100 that is suitable for implementing the present invention. System 100 includes a floating point register file 110, an operand delivery module 120, a primary FMAC 130, a secondary FMAC 140, and an output conversion module 150. Primary FMAC 130 processes unpacked operands in a register file ("unpacked") format. Secondary FMAC 140 processes component operands of a packed operand. Operand delivery module 120 couples data from register file 110 to FMACs 130 and 140 in the appropriate formats.

In the disclosed embodiment of system 100, register file 110 includes multiple register entries 112. For one embodiment, each entry 112 has an associated implicit bit 114 which may be set to indicate whether data stored in associated register entry 112 is normalized. Implicit bits are defined, for example, in the IEEE std. 754. An implicit bit may be combined with a component operand from a packed operand to characterize the operand for processing. For example, an implicit bit may be set to indicate that data is in normal form.

For scalar operations, operand delivery module 120 provides an unpacked floating point operand from register file 110 to primary FMAC 130. The unpacked operand is stored in register file 110 in a register file format. For vector operations, operand delivery module 120 retrieves a packed operand from register file 110, converts one component operand to an unpacked operand, and provides it to primary FMAC 130. The second component operand is provided to secondary FMAC 140. Primary FMAC 130 is thus shared between vector and scalar operations, while secondary FMAC 140 provides the additional execution resource for vector operations.

Results generated by FMACs 130 and 140 are coupled to output conversion module 150 for recombination into a packed data format. For one embodiment of the invention, a bypass 160 couples output data from primary FMAC 130 to operand delivery module 120 prior to repacking. The bypassed data may undergo additional processing by primary FMAC 130 without first being repacked by conversion module 150 and subsequently unpacked by operand delivery module 120. This bypass loop eliminates the input conversion (packed to unpacked data) from the bypass path.

System 100 is shown having a single floating point pipeline, but the present invention is not limited to single pipeline systems. It may be replicated in one or more additional pipelines to provide superscalar floating point SIMD operations. That is, two or more vector instructions may be processed in parallel.

Figure 2:
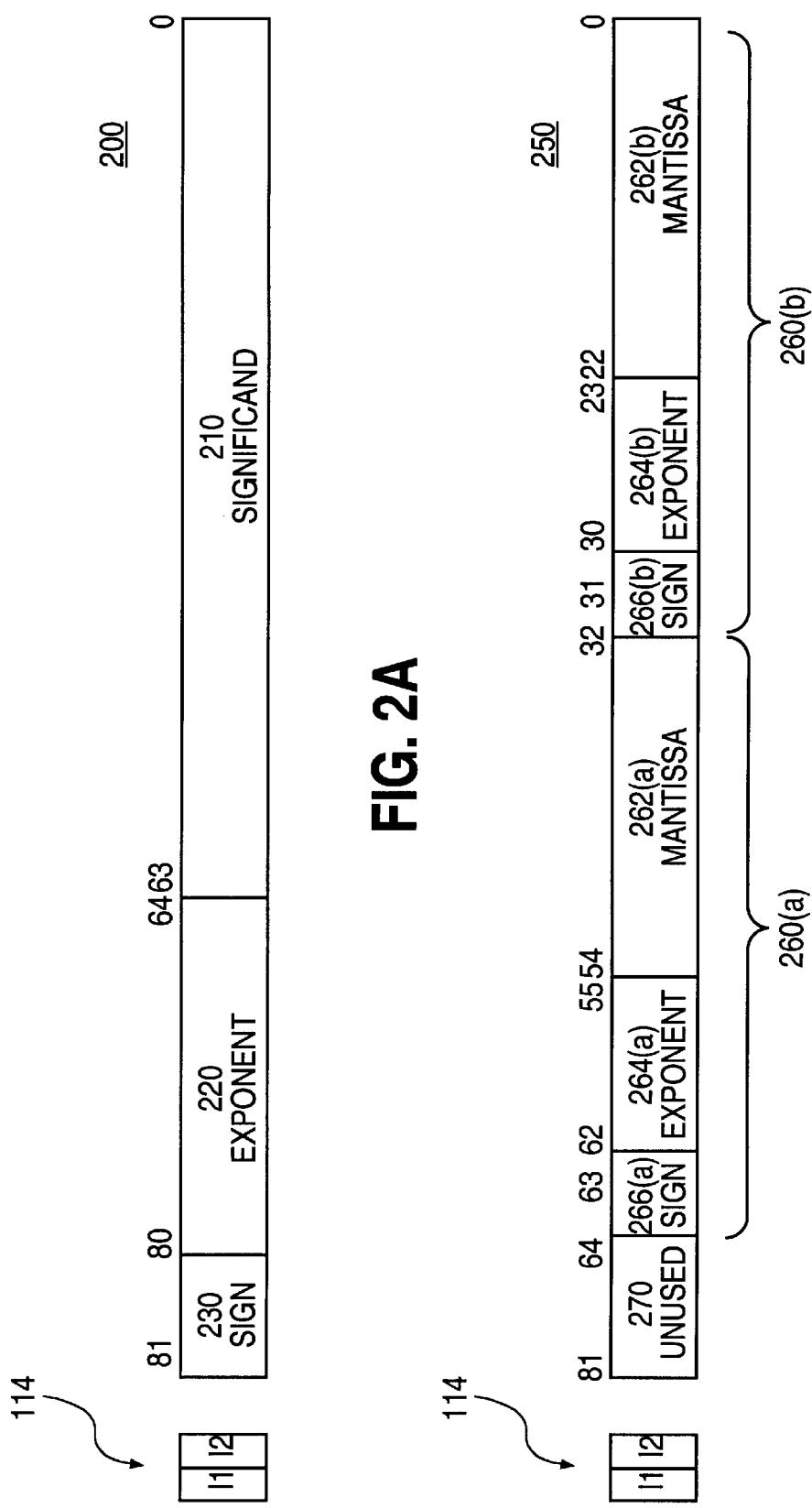
FIGS. 2A and 2B represent the bit fields for unpacked and packed operands, respectively, in an entry of the register file shown in FIG. 1.

FIG. 2A shows one embodiment of an unpacked operand 200 in a register file format ("RFF operand) that is suitable for use with the present invention. RFF operand 200 includes a significand field 210, an exponent field 220, and a sign field 230. For one embodiment of the invention, significand field 210 is 64-bits, exponent field 220 is 17 bits, and sign field 230 is one bit.

FIG. 2B shows one embodiment of a packed operand 250 in a packed data format ("PDF operand") that is suitable for use with the present invention. The disclosed embodiment of PDF operand 250 includes first and second component operands 260($a$) and 260($b$), respectively. In the following discussion, the index is dropped unless required to distinguish a particular component operand 260. A block of unused bits 270 is also shown in PDF operand 250. Unused bits 270 are added to component operands 260 to fill the register file entry. Each component operand 260 includes a mantissa field 262, an exponent field 264, and a sign field 266. For one embodiment, mantissa field 262 is 23 bits wide, exponent field 264 is 8 bits wide, and sign field 266 is 1 bit wide. In the disclosed embodiment, each component operand is in a single precision floating point format as specified, for example, in IEEE standard 754-1985.

Also shown in FIGS. 2A and 2B are implicit bit(s) 114, which are associated with each register file entry 112 (FIG. 1). Implicit bit(s) 114 may be used to indicate whether a component operand is zero or denormal. For one embodiment of FP register file 110, implicit bits may be determined as data is written to register entry 112 of register file 110, i.e. "on-the-fly". This eliminates the need for additional logic in operand delivery module 120 to determine the normal/denormal status of an operand, which would only slow processing of vector operands. For example, evaluating the normal/denormal status of a component operand on delivery to FMAC 140 would require an OR gate in a critical path of operand delivery system 120.

For register file entries 112 storing unpacked and packed operands as in FIGS. 2A and 2B, respectively, implicit bits 114, e.g. bits 82 and 83 are set as follows when the data is written to register file 110:

IF (data [62:55]='0::8), THEN data[83]='0, ELSE '1
IF (data [30:23]='0::8), THEN data[82]='0, ELSE '1.

Here, '1 and '0 indicate binary one and binary zero, respectively. Implicit bits are available to operand delivery module 120 to provide component operands 260 in a format suitable for processing. For example, component operand 260 has a mantissa field 262 that accommodates 23 bits. A 24 bit significand may be formed by appending the associated implicit bit to the 23 bit mantissa as the most significant bit. In the disclosed embodiment, this conversion is not required for RFF data 200. However, the logic is simplified by determining implicit bits 114 for each operand written to register file 110, and ignoring them when a RFF data 200 is being processed.

For one embodiment of the invention, one of component operands 260 is converted to an RFF operand for processing by primary FMAC 130, and the other component operand is provided to secondary FMAC 140 for processing.

Figure 3:
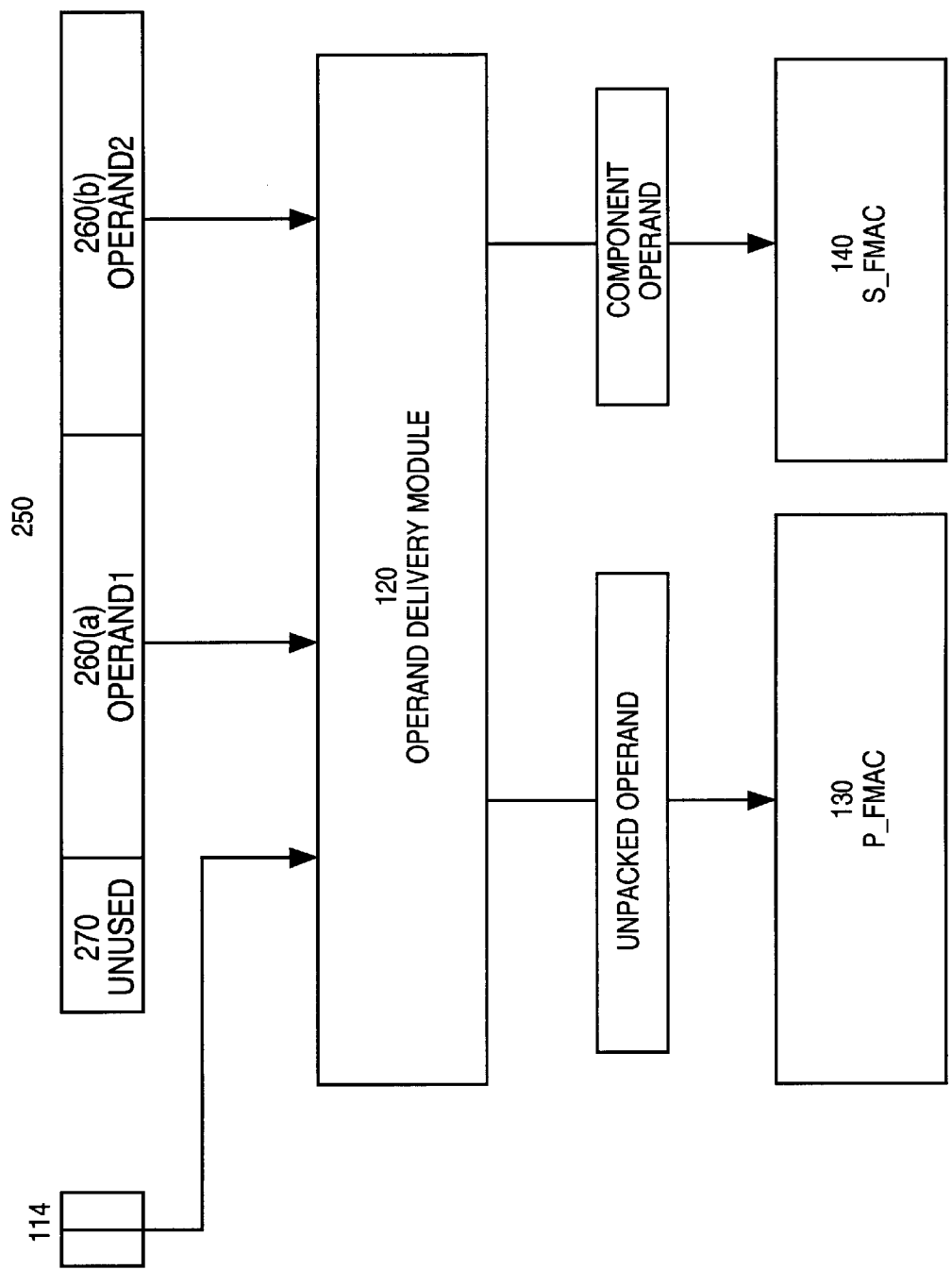
FIG. 3 is a block diagram representing the operation of operand delivery module on a packed operand.

FIG. 3 is a schematic representation of the operations implemented by operand delivery module 120 to provide properly formatted data to FMACs 130 and 140. In the disclosed embodiment, an implicit bit 114 is combined with data from component operand 260($a$), which is converted to an RFF operand for processing by primary FMAC 130. One feature of the present invention is that this conversion process may be implemented without loading primary FMAC 130 and, consequently, degrading its performance on scalar operations. Component operand 260($b$) is provided to secondary FMAC 140 for processing, which may be optimized to process operands in that component format. While FMAC 130 is shown processing the upper component operand (260($a$)) of the packed operand, this is not necessary. More generally, any of the component operands of the packed operand may be selected for routing to FMAC 130.

For one embodiment of the invention, operand delivery module 120 accomplishes data conversion by bit steering packed operand 250 into an unpacked operand 200. For example, data from mantissa field 262($a$) and implicit bit 114 (I1) may be converted to RFF significand data (significand field 210). Similarly, data from exponent field 264($a$) may be converted to RFF exponent data (exponent field 220). Data from sign field 266($a$) may be mapped to an RFF sign bit (sign field 240). The various conversion steps are considered in greater detail below, using the exemplary data formats provided in conjunction with FIGS. 2A and 2B.

Significand Conversion

The exemplary embodiment of component operand 260 ($a$) includes a 23 bit mantissa field 262($a$). For one embodiment of the invention, data from mantissa field 262($a$) is converted to an RFF significand by: (1) prepending an associated implicit bit 114 to the MSB position of a 23 bit mantissa from component mantissa field 262; and (2) appending binary zeroes to the least significant bit of the mantissa to form a 64-bit RFF significand. Bit-steering for the mantissa is summarized in Table 1, which indicates the bit(s) input to primary ($1°$) FMAC 130 from register entry 112, the function of the bit(s), the source of the bit(s) for scalar instructions, and the source of the bit(s) for vector instructions.

TABLE 1

| BITS AT 1° FMAC INPUT | BIT FUNCTION | SOURCE BITS FOR SCALAR INST. | SOURCE BITS FOR VECTOR INST. |
|---|---|---|---|
| [63] | Implicit bit | [63] | [83] |
| [62:40] | Upper significant bits | [62:40] | [54:32] |
| [39:0] | Lower significant bits | [39:0] | '0 :: 40 |
| [81] | Sign bit | [81] | [63] |

As noted above, while these operands share the same footprint in register file 110, i.e. register entry 112, their operands are mapped to different bits of register entry 112.

In the disclosed embodiments of RFF operand 200 and PDF operand 250, the implicit bit is specified by bit 63 and bit 83, respectively. In order to accommodate both data formats, operand delivery module 110 may employ a 2:1 multiplexer (MUX) to select the appropriate source bit for input to FMAC 130. Introducing an additional 2:1 MUX into the logic chain between register file 110 and FMAC 130 loads operand delivery module 120 and slows the delivery of data to FMAC 130. The loading reduces performance for both scalar and vector operations. For one embodiment of the invention, bit steering is accomplished by providing an additional leg to an existing 3:1 MUX (FIG. 4) in operand delivery module 110 for bypassing data (late bypass 4:1 MUX). This eliminates the need to add an additional MUX to the data path between register file 110 and FMAC 130.

Exponent Conversion

For the disclosed embodiment, RFF and PDF exponents are expressed relative to different biases. The difference between the biases may be taken into account when converting the PDF exponent (field 264) to an RFF exponent (field 220). For one embodiment, the RFF bias value is FFFFh and the PDF bias value is 7Fh, i.e. the exponent bias for single precision real numbers in the IEEE standard. The difference between these values is FF80h.

One approach to exponent conversion adds FF80h to an 8-bit exponent value in PDF exponent field 264 to obtain the RFF exponent. A problem with this approach is that it employs an adder in the data path between register file 110 and primary FMAC 130. The additional gate delay in operand delivery module 120 degrades the performance of system 100 for both vector and scalar operations. An alternative approach to adjusting exponent biases eliminates the need for an adder.

Table 2 summarizes the bias adjustment process performed to convert a PDF exponent to an RFF exponent for the case where the bias difference is FF80h. Here, E0 through E7 are the 8 bits in PDF exponent field 264(a) and 0 1 1 1 1 1 1 1 1 1 0 0 0 0 0 0 0 is FF80h expressed in binary. As indicated in Table 2, exponent conversion can be achieved by inverting the 8$^{th}$ exponent bit (E7→$\overline{E7}$) in PDF exponent field 264(a), replicating it in the next 9 bit positions of the RFF exponent (field 220), and copying the uninverted 8$^{th}$ bit (E7) to the most significant bit position of the RFF exponent. These operations may be accomplished with an inverter and appropriately routed traces. No adder is needed, and the performance impact of the inverter on operand delivery module 120 and primary FMAC 130 is not significant.

TABLE 2

| Bit Position | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| SIMD Exp. |  |  |  |  |  |  |  |  |  | E7 | E6 | E5 | E4 | E3 | E2 | E1 | E0 |
| Constant | 0 | 1 | 1 | 1 | 1 | 1 | 1 | 1 | 1 | 1 | 0 | 0 | 0 | 0 | 0 | 0 | 0 |
| Result | E7 | $\overline{E7}$ | $\overline{E7}$ | $\overline{E7}$ | $\overline{E7}$ | $\overline{E7}$ | $\overline{E7}$ | $\overline{E7}$ | $\overline{7}$ | $\overline{7}$ | E6 | E5 | E4 | E3 | E2 | E1 | E0 |

The approach summarized in Table 2 does not work for single precision denormal numbers. Denormal numbers may be identified by the value of the associated implicit bit 114, and conversion may be implemented using a software handler. The exponent bit steering discussed above is summarized in Table 3.

TABLE 3

| EXPONENT BITS AT 1° FMAC INPUT | BIT FUNCTION | SOURCE BITS FOR SCALAR INST. | SOURCE BITS FOR VECTOR INST. |
|---|---|---|---|
| [6:0] | Lower exp bits | [70:64] | [61:55] |
| [15:7] | Middle exp bits | [79:71] | [62# :: 9] |
| [16] | Upper exp bits | [80] | [62] |

Here, "#" indicates that the bit is inverted. The exponent bits are numbered for primary FMAC 130 beginning with the first bit of the exponent field.

Figure 4:
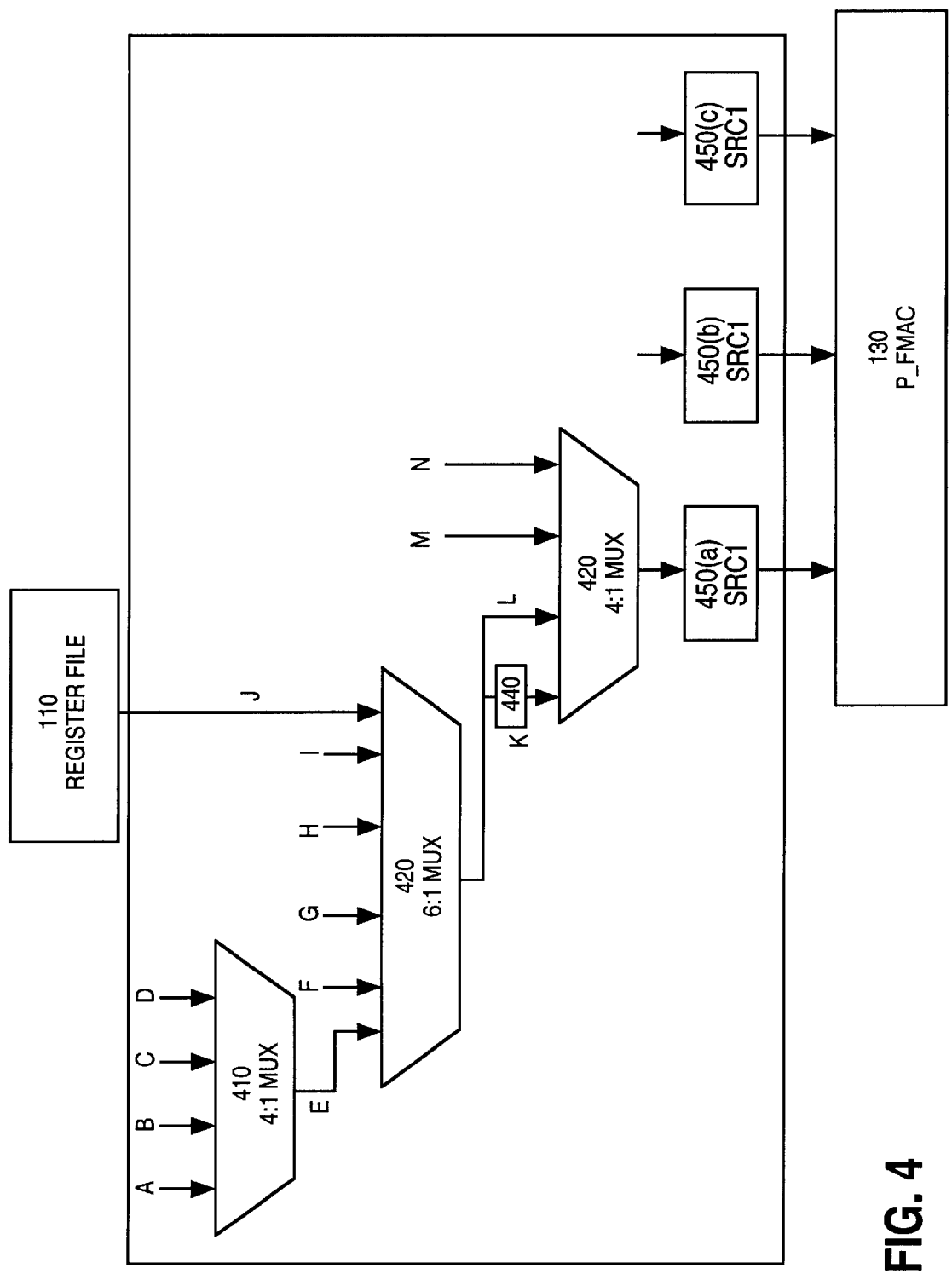
FIG. 4 is a circuit diagram of one embodiment of the operand delivery system shown in FIG. 1.

FIG. 4 represents one embodiment of operand delivery module 120 that is suitable for use in a processor having first and second floating point pipelines, pipe0 and pipe1, respectively. The present invention is not limited to the particular number of pipelines employed in the processor. The disclosed embodiment of operand delivery module 120 includes a 4:1 early bypass MUX (EBPM) 410, a 6:1 middle bypass MUX (MBPM) 420, and a 4:1 late bypass MUX (LBPM) 430. For the exemplary data formats described above, operand delivery module 120 converts a 32-bit component operand 260(a) from a packed or PDF operand 250 into an 82 bit unpacked or RFF operand 200. EBPM 410 receives cached data for pipe0 and pipe1 at inputs A and B. Write-back data from the backend of pipe0 and pipe1 may be coupled into operand deliver module 120 through inputs C and D. A control input of EBPM 410 selects data from one of inputs A, B, C, or D to be provided to MBPM 420. MBPM 420 receives data from EBPM 410 at input E. Bypass data from one stage of pipe0 and pipe1 is received at inputs F and G, respectively. Data from a load converter (not shown) for pipe0 and pipe1 is received at inputs H and I, respectively, and data from register file 110 is received at input J. A control input of MBPM 420 selects data from one of inputs E, F, G, H, I, or J to be provided to LBPM 430.

LBPM 430 receives bypass data from another stage of pipe0 and pipe 1 at inputs M and N, respectively. Input K of LBPM 430 receives data from MBPM 420 through bit steering block 440, which implements the conversions described above for vector operations. In the above-example, bit-steering block 440 includes an inverter and bit-steering traces to reformat data from upper component operand 269(a) to RFF data. For example, bit-steering block includes logic and traces to convert a 23-bit PDF mantissa to a 64-bit RFF significand and to convert an 8-bit PDF exponent to a 17-bit RFF exponent with a readjusted bias. For scalar operations, input L of LBPM 430 receives data from MBPM 420 without intervening bit-steering or inversion. Data from one of inputs K or L is provided to primary FMAC 130 according to whether packed or unpacked data, respectively, is being processed.

In the embodiment of FIG. 4, converted (bit-steered) and unconverted data is provided to primary FMAC 130 by selecting the appropriate input K or L, respectively. This allows data from register file 110 or any of the relatively early bypass stages to be converted at LBPM 430. In the disclosed embodiment, late bypass data at inputs M and N may be converted by replicating each input with a corresponding bit-steering block 440. However, if bypassed data at inputs M and N is not packed prior to the late bypass, there is no need to unpack it. Use of additional legs and bit steering blocks 440 on LBPM 430 may be avoided.

For one embodiment of operand delivery module 120, late bypass data may be provided to LBPM 430 via bypass 160 (FIG. 1). Bypass 160 captures the outputs of primary and secondary FMACs 130 and 140, respectively, before they are repacked into, e.g., PDF format 250. In this embodiment, no additional expansion of LBPM 430 or its inputs is required for bypassed data.

Figure 5:
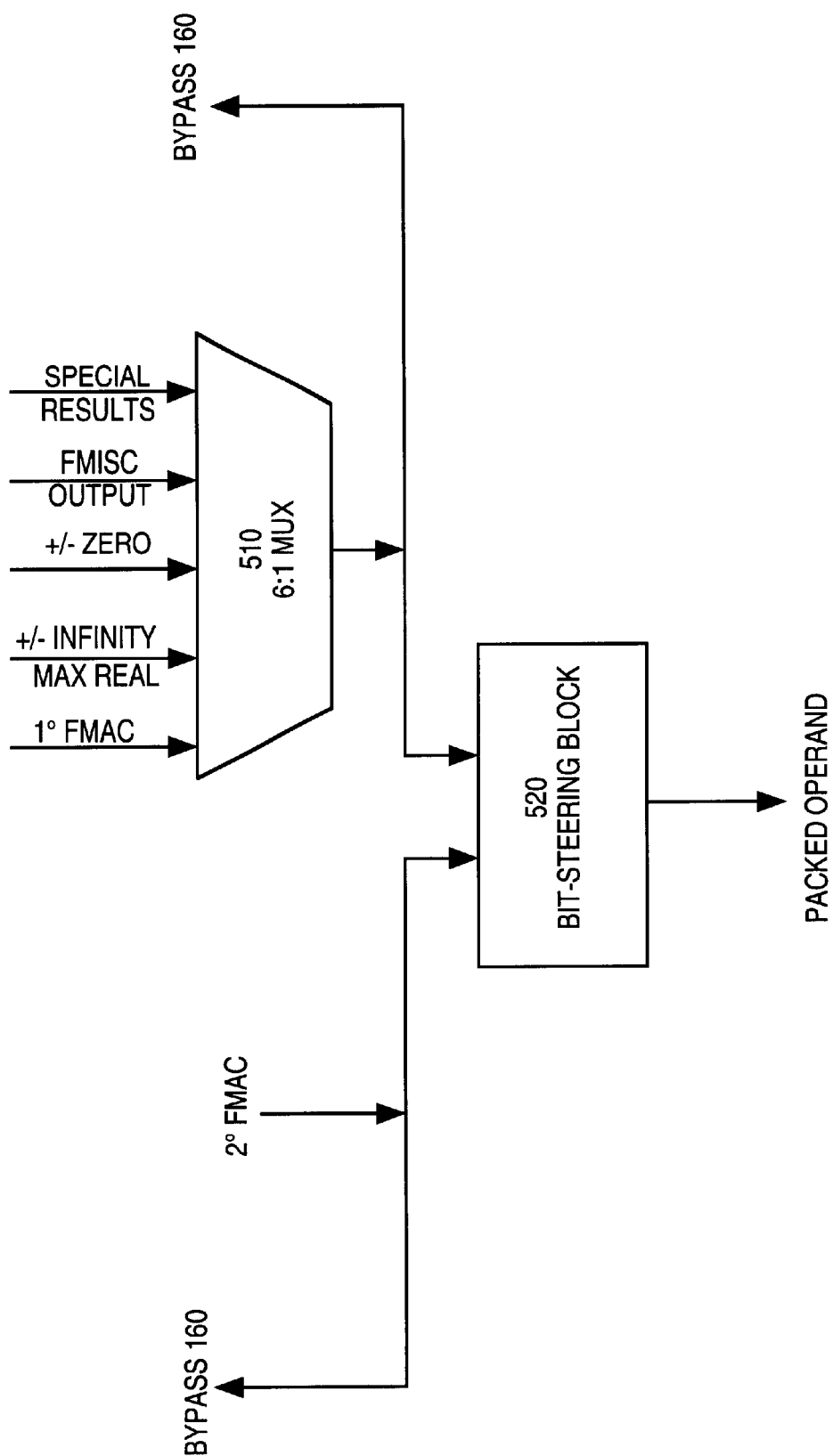
FIG. 5 is a circuit diagram of one embodiment of the output conversion module shown in FIG. 1.

FIG. 5 shows one embodiment of output conversion module 150. The disclosed embodiment of output conversion module includes a primary output MUX 510 and bit-steering block 520. Primary output MUX 510 includes inputs to receive results from primary FMAC 130 and various FPU resources (FMISC) 154, as well as special result encodings. For the exemplary data formats, FMAC 130 provides a result as an unpacked (RFF) operand 200 (82-bit) for both scalar and vector operations. In the latter case, bit steering block 520 combines the unpacked operand from primary FMAC 130 with a component operand from secondary FMAC 140 to form a packed operand.

The special encodings provided to primary output MUX 510 indicate special results, such as zero, infinity, or a maximum real (largest representable floating point value) in the register file format. For the disclosed embodiments, these encodings may be converted for vector operations, as necessary, using the bit steering operations described above. If more elaborate conversions are required for zero, infinity, and Max Real results, they may be implemented in earlier stages of operand delivery module 120, since the necessary information is available relatively early in the floating point execution pipeline. No additional delay is introduced into the critical path.

For vector operations, the results of primary FMAC 130 and secondary FMAC 140 are repacked to provide the result as a PDF operand. In the disclosed embodiment, the lower 32 bits of the 82-bit entry receive the component operand result from secondary FMAC 140. The next most significant 32-bits are provided, through bit-steering, by the unpacked operand result from primary FMAC 130. The upper 18-bits receive implementation-dependent constants, e.g. in the disclosed embodiment, these are '1 & 1003Eh.

The unpacked (RFF) exponent provided by primary FMAC 130 has an excess bias of FF80h relative to the IEEE single precision format employed for component operands 260 in packed operand 250. The excess bias is subtracted from the unpacked operand result when it is converted to a component operand result for packing. In the exemplary embodiment, this may be accomplished by adding the 2's complement of FF80h to the 17 bit RFF exponent and using the lower 8-bits of the result as the exponent for the component operand. As before, the conversion may be accomplished without loading the floating point pipeline with an additional adder, using the bit-steering operation represented in Table 4.

TABLE 4

| Bit Position | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| RFF Exp. | E16 | | | | | | | | | E7 | E6 | E5 | E4 | E3 | E2 | E1 | E0 |
| Constant | 0 | 0 | 0 | 0 | 0 | 0 | 0 | 0 | 0 | 1 | 0 | 0 | 0 | 0 | 0 | 0 | 0 |
| Result | — | — | — | — | — | — | — | — | — | $\overline{7}$ | E6 | E5 | E4 | E3 | E2 | E1 | E0 |

As indicated in Table 4, exponent bits for the component operand may be derived from the unpacked operand provided by primary FMAC 130 without addition. In the above example, they are provided by the lower 8 exponent bits of the unpacked operand result, with the $8^{th}$ bit inverted. The upper 8 bits, which are ignored in the conversion operation, are not shown in Table 2.

Table 5 summarizes the bit-steering operation that packs an unpacked operand result from primary FMAC 130 with a component operand result from secondary FMAC 140 to provide a packed operand result for vector operations.

TABLE 5

| PACKED OPERAND BITS | FUNCTION OF PO BITS | RESULT BITS FROM 1° FMAC | RESULT BITS FROM 2° FMAC |
|---|---|---|---|
| [83] | Implicit bit of $1^{st}$ CO | [63] | — |
| [82] | Implicit bit of $2^{nd}$ CO | — | [23] |
| [81] | Unused constant (sign bit in RFF) | — | — |
| [80:64] | Unused constant (exp bits in RFF) | — | — |
| [63] | Sign bit for $1^{st}$ CO | [81] | |
| [62] | MSB of $1^{st}$ CO exp | [$\overline{71}$] | — |
| [61:55] | Remaining exp bits of $1^{st}$ CO | [70:64] | — |
| [54:32] | Mantissa bits of $1^{st}$ CO | [62:40] | — |
| [31] | Sign bit for $2^{nd}$ CO | — | [32] |
| [30:23] | Bits of $2^{nd}$ CO Exp | [31:24] | |
| [22:0] | Mantissa bits of $2^{nd}$ CO | — | [22:0] |

Here, "CO" refers to component operand, "Result bits from 1° FMAC" refers to the packed operand result generated by primary FMAC 130, and "Result bits from 2° FMAC" refers to the component operand result generated by the secondary FMAC 130.

For certain instructions executed by the FMAC, additional control signals are provided to the FMAC to modify operation of the unit. For example, the FMAC may be used to convert floating point operands to integer operands. The conversion may be applied to both vector and scalar operands. The bit shifting required for the vector and scalar cases is different, and a separate control signal is provided to adjust FMAC operation accordingly. The mulitply accumulate operations discussed above, e.g. those involved in matrix multiplication and coordinate transformations, are processed without any such internal modifications of the FMAC units.

There has thus been provided a system for processing SIMD or vector operations using a combination of scalar and vector execution units. The amount of additional execution hardware that must be added to the system is reduced, while the performance of the scalar execution hardware is preserved. A scalar and a vector execution unit are provided for each pipeline in the system. An operand delivery module provides data from a register file to the scalar and vector execution units. For SIMD operations, the operand delivery module retrieves a packed operand from the register file, converts a component operand to an unpacked operand via bit steering, and provides the unpacked operand to the scalar execution unit for processing. A second component operand is provided to the vector execution unit. Bit steering logic includes trace routings and inverter, which has a minimal impact on the performance of the system for both scalar and vector operations.

What is claimed is:

1. A system for performing vector operations comprising:
   a scalar floating-point multiply-accumulate module (FMAC) to perform multiply accumulate operations on an unpacked operand;
   a vector FMAC to perform multiply accumulate operations on a component operand of a packed operand; and
   an operand delivery module to identify the packed operand, convert a component operand of the packed operand for processing by the scalar FMAC, and deliver the converted operand to the scalar FMAC.

2. The system of claim 1, wherein the operand delivery system includes bit-steering circuitry to convert one of the component operands into an unpacked operand.

3. The system of claim 2, wherein the bit-steering circuitry includes an inverter to convert data in an exponent of the component operand to an exponent the unpacked operand.

4. The system of claim 3, further including an output converter to convert results provided by the scalar and vector FMACs into a packed operand.

5. The system of claim 3, wherein the unpacked operand is an 82-bit floating point operand and the component operand is a 32-bit floating point operand.

6. A processor comprising:
   a first FMAC to perform floating point multiply-accumulate operations on operands in a first format;
   a second FMAC to perform floating point multiply-accumulate operations on operands in a second format;
   an operand delivery module to couple packed data in the second format from the floating point register to the first and second FMACs, the operand delivery system including circuitry to convert a packed data operand from the second format to the first format prior to delivering the converted operand to the first FMAC.

7. The processor of claim 6, wherein the operand delivery system includes a late bypass multiplexer (MUX) that is coupled to the first FMAC, the late bypass MUX having a first leg to couple floating point data in the first format to the first FMAC and a second leg to couple floating point data in the second format to the first FMAC through a bit steering block.

8. The processor of claim 7, wherein the bit steering block of the first leg includes bit-steering circuitry and an inverter to convert floating point data in the second format to floating point data in the first format.

9. A system for processing a packed operand comprising:
a register file to store the packed operand;
a vector floating-point execution unit to process a first component operand of the packed operand;
a scalar floating-point execution unit to process an unpacked operand; and
an operand delivery system to convert a second component operand of the packed operand into an unpacked operand and to provide the first component operand and the unpacked operand for parallel processing by the vector and scalar floating-point execution units, respectively.

10. A processor comprising:
a register file including a plurality of register entries, each register entry being capable of storing a single N bit operand in an unpacked format or a plurality of M bit operands in a packed format;
a first floating-point multiply accumulate unit (FMAC) to process N-bit operands;
a second FMAC to process one of the M-bit operands;
a first data path between the register file and the first FMAC to provide an N-bit operand to the first FMAC for a scalar multiply accumulate operation; and
a second data path between the register file and the first FMAC to provide an M-bit operand to the first FMAC as an N-bit operand for a vector multiply accumulate operation.

11. The processor of claim 10, wherein the first data path includes traces between N-bit positions in the register file entry and an input of the first FMAC and the second data path includes a bit-resteering block.

12. The processor of claim 11, wherein the bit-resteering block includes traces to couple data at M-bit positions in the register file entry to selected bit positions at the input of the first FMAC, one of the bit resteering traces including an inverter.

13. The processor of claim 10, wherein the first and second data paths are provided as first and second legs on a multiplexer.

14. The processor of claim 10, wherein the second data bath includes a bit-resteering block to map the M-bit operand in the second format to an N-bit operand at the input of the first FMAC.

15. The processor of claim 10, further comprising an output conversion module to receive N-bit and M-bit results from the first and second FMACs and pack them as first and second operands in the packed format.

16. The processor of claim 10, wherein M is 32 and N is 82.

17. A method for processing a packed operand including a plurality of SIMD operands comprising:
providing a first of the SIMD operands to a vector floating-point execution unit;
converting a second of the SIMD operands to an unpacked data format; and
providing the converted SIMD operand to a scalar floating-point execution unit.

18. The method of claim 17, wherein converting comprises:
mapping mantissa bits of the SIMD operand to significand bits in the first data format; and
prepending an implicit bit to the significand bits in the first data format; and
appending binary zeroes to the significand bits in the first data format.

19. The method of claim 17, wherein converting further comprises:
mapping P-1 exponent bits of the SIMD operand to a least significant P-1 exponent bits of a Q-bit exponent field in the first data format;
mapping a $P^{th}$ exponent bit of the SIMD operand to a $Q^{th}$ exponent bit of the Q bit exponent field; and
mapping inverted copies of the $P^{th}$ exponent bit of the SIMD operand to $P^{th}$ through Q-$1^{st}$ exponent bits of the Q bit exponent field.

* * * * *

UNITED STATES PATENT AND TRADEMARK OFFICE
CERTIFICATE OF CORRECTION

PATENT NO.    : 6,292,886 B1
DATED         : September 18, 2001
INVENTOR(S)   : Makineni et al.

It is certified that error appears in the above-identified patent and that said Letters Patent is hereby corrected as shown below:

<u>Column 9,</u>
TABLE 5, move "[31:24]" to the last column in the table.

Signed and Sealed this

Sixth Day of April, 2004

JON W. DUDAS
*Acting Director of the United States Patent and Trademark Office*